INVENTOR.
Franz Müller

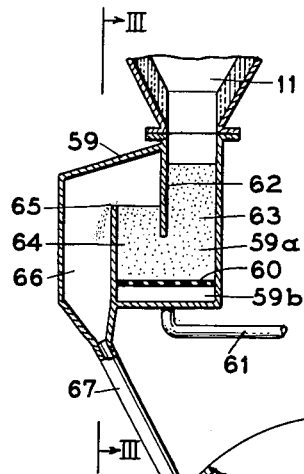
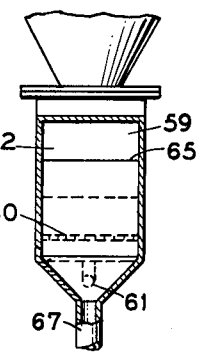
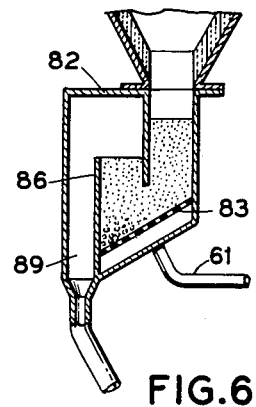
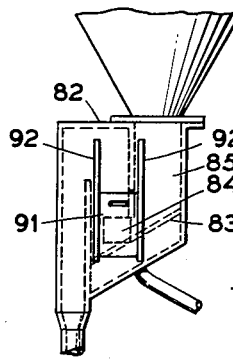
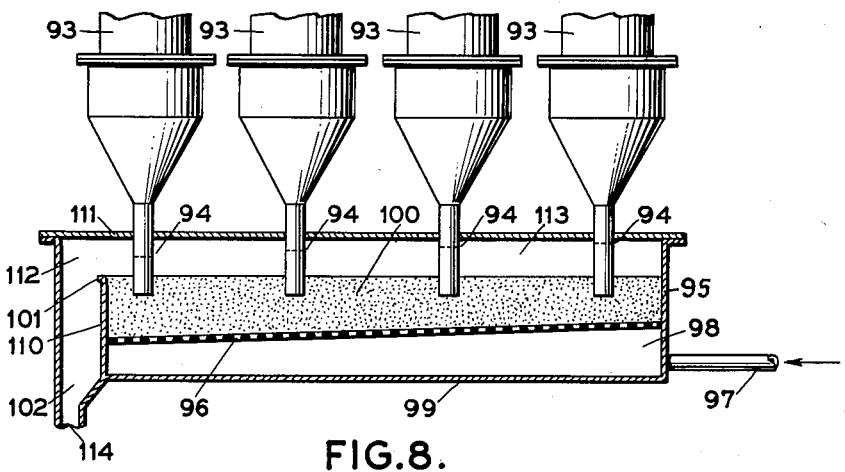
FIG.2. FIG.3. FIG.6. FIG.7. FIG.8.
INVENTOR.
Franz Müller United States Patent Office  2,756,981
Patented July 31, 1956

2,756,981

INSTALLATION FOR THE HEATING OF FINE GRANULAR MATERIAL, ESPECIALLY CEMENT RAW MATERIAL

Franz Müller, Refrath, Bezirk Koln, Germany, assignor to Klöckner-Humboldt-Deutz Aktiengesellschaft, Koln-Deutz, Germany, a corporation of Germany Application January 4, 1954, Serial No. 401,785

Claims priority, application Germany February 27, 1953

8 Claims. (Cl. 263—32)

My invention relates to apparatus for heating pulverulent or granular materials, and more particularly, to apparatus for preheating cement raw material by the heat contained in the exit gases from a rotary kiln to which the material is being supplied.

One of the known apparatus for the preheating of cement raw material by exit gases from a rotary kiln comprises a number of serially interconnected cyclone-type heat exchangers designed and operated in the manner of rotary gas flow dust separators. The kiln gases are forced through the separators by a blower, and the material to be heated is passed through the cyclones in counterflow to the gases. The cement material precipitated in each separator drains off through a material conveying pipe into a gas conduit in which it is conveyed by the gas stream entering the next lower separator. A gas sealing means in the various material conveying pipes prevents the gas from bypassing the separators through these pipes and thus permits maintaining appreciable pressure differences between the separators. As a consequence, the material being conveyed in the various pipes is in an unaerated state and may have the tendency to excessively accumulate and plug within the gas sealing means especially when the material is to be preheated to a high degree at which, with the particular composition, the surfaces of the particles of material become adhesive and agglomerate, or adhere to the surfaces of the apparatus. This also results in a decreased operative efficiency of the apparatus because unaerated accumulations of particles may enter into the gas stream for entrainment, and it is difficult to reliably secure entrainment of such accumulations especially if the material has become agglomerated.

It is an object of my invention to provide an apparatus of the above-mentioned type, particularly for preheating cement raw material, that, while retaining the advantages of the known cyclone-type preheaters, not only eliminates the tendencies of the material to accumulate and agglomerate within the apparatus, but also secures a more efficient and more reliable entraining of the material in the gas stream.

To this end, and in accordance with my invention, I provide each of the various material conveying pipes, in a multi-separator apparatus of the above-mentioned type, with a dust trapping seal structure at a place outside the gas conduits and immediately adjacent to the respective separators; and I further connect each of these seal structures with a source of a gaseous agent of lower temperature than the kiln waste gases so that the material trapped in the seal is traversed by a gas stream, other than that of the heat supplying waste gases, which suffices to prevent adhesion of the material to the trap and pipe surfaces without appreciably reducing the heat exchanging efficiency of the apparatus as a whole.

According to other features of my invention, a plurality of separators are disposed at different respective heights above the kiln, each separator having a gas inlet, a gas outlet conduit and a material discharge opening.

A gas conduit extends from the kiln, the source of hot gas, upwardly to the gas inlet of the lowermost separator. The gas outlet conduit of each separator is connected to the gas inlet conduit of the next upper separator. The gas outlet conduit of the uppermost separator is connected to the suction side of a blower. Thus there is a continuous ascending gas path from the kiln through all separators of the heating apparatus. Each separator is provided with a gas seal container positioned immediately beneath the separator and in direct communication with the material outlet of the separator. The container is divided into a material chamber and a plenum chamber by a gas permeable wall positioned between the top and bottom of the container. Air is admitted to the plenum chamber to fluidize the material contained in the material chamber. Each separator is provided with a material discharge pipe communicating with the material chamber and extending downwardly therefrom into the gas outlet conduit of the next lower separator where it dispenses aerated material into the gas stream. Material is admitted into the gas inlet conduit of the uppermost separator from which it flows downwardly through the respective separators to the kiln.

In such an apparatus the material precipitated in each separator becomes mixed with a small amount of a gas of lower temperature as the material that passes out of the separator and through the gas sealing means. This renders the material more adaptable for entrainment as the material discharges into the gas stream in an aerated state. The supply of a cooling gas to the material in the trap seal also reduces the tendency of the hot adhesive material to adhere to the surfaces of the apparatus, or to agglomerate into larger particles, by cooling the surfaces of the material by low pressure low volume gas without appreciably reducing the temperature of the material.

The foregoing and more specific objects and advantages, as well as the essential features of the invention set forth with particularity in the claims annexed hereto, will be apparent from the following description of the embodiment of a cement-material preheating apparatus exemplified by the drawings in which:

Fig. 2 is a side elevation, in section, of one of the gas sealing means;

Fig. 3 is an end view of the gas sealing means;

Fig. 6 is a side elevation in section of a modified form of the gas sealing means;

Fig. 7 is a side elevation of the modified form of the gas sealing means; and

Fig. 8 is a side elevation, partly in section, of a modified form of the dust collecting system.

Figure 1:
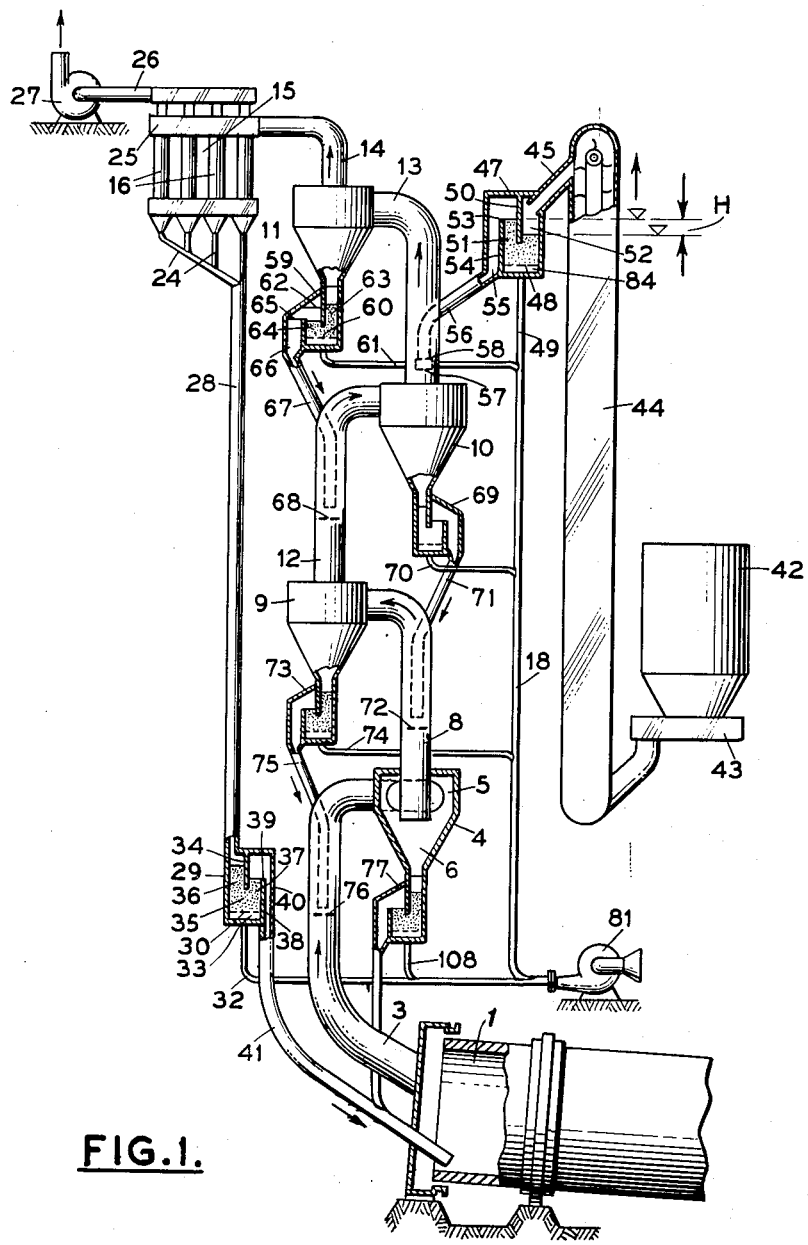
Fig. 1 is a schematic diagram of the entire apparatus.

As schematically shown in Fig. 1, a rotary kiln 1 supplies hot gases to a cyclone-type separator 4 through a gas conduit 3. The separator 4 discharges the gas into a gas conduit 8 connected to the gas inlet of a separator 9. The gas discharge of the separator 9 passes through a gas conduit 12 to a separator 10. The separator 10 discharges gas through a gas conduit 13 to a separator 11. A gas conduit 14 extends from the discharge outlet of the separator 11 to a dust collecting system 15 composed of several cyclones 16 as will be described in a later place. The gas from the dust collecting system 15 flows through a conduit 26 to the intake side of a blower 27, from which it is discharged to atmosphere. The separators 4, 9, 10, 11 and preferably also the gas conduits 3, 8, 12, 13 may be lined with heat insulation to minimize heat losses.

A feed bin 42 furnishes raw material to a bucket type elevator 44 through a conventional withdrawing means designated generally as 43. The material discharges from elevator 44 into a supply pipe 45 connected to the material inlet opening of a gas sealing container 47. A material discharge pipe extends from the material outlet opening of container 47 through the gas conveying conduit 13. The gas sealing container 47, as well as the gas sealing containers mentioned presently, will be more fully described in a later place. A gas sealing container 59 is connected with the material outlet opening of the separator 11 and is provided with a material discharge pipe 67 terminating within the gas conveying conduit 12. A gas sealing container 69 is disposed beneath the material discharge outlet of the separator 10. A material discharge pipe is connected with the material outlet opening of container 69 and terminates within the gas conveying conduit 8. In a like manner, a gas sealing container 73 is positioned beneath the material outlet of the separator 9 and is provided with a material discharge pipe 75 terminating within the gas conveying conduit 3. A gas sealing container 77 is positioned beneath the material outlet of the separator 4 and discharges material into the feed pipe 41 of the rotary kiln 1 through a material discharge pipe 109.

The various gas seal containers are all designed as shown for the container 59 in Figs. 2 and 3. The container 59 is divided into a material confining chamber 59a and a plenum chamber 59b by a gas permeable member 60 positioned between the top and bottom of the container 59. The material confining chamber 59a is further divided by a vertical baffle plate 62 into a compartment 63 and a compartment 64. A vertically disposed weir plate 65 forms one side of the compartment 64 and separates the compartment 64 from a material discharge chamber 66. The material confining chamber 59a is in communication with the material discharge opening of the separator 11. A material discharge pipe 67 extends from the material discharge outlet of the container 59 into the gas conveying conduit 12. A material distribution plate 68 is connected to the discharge end of the material pipe 67 terminating within the conduit 11 by flanges 78. An air supply pipe 61 furnishes air to the plenum chamber 59b.

The design of the sealing container may be modified by omitting the baffle plate and passing a pipe from the bottom end of the cyclone through the container wall to a point upwardly spaced from the porous member 60. Such a modification will be described below in conjunction with Fig. 8.

Figure 4:
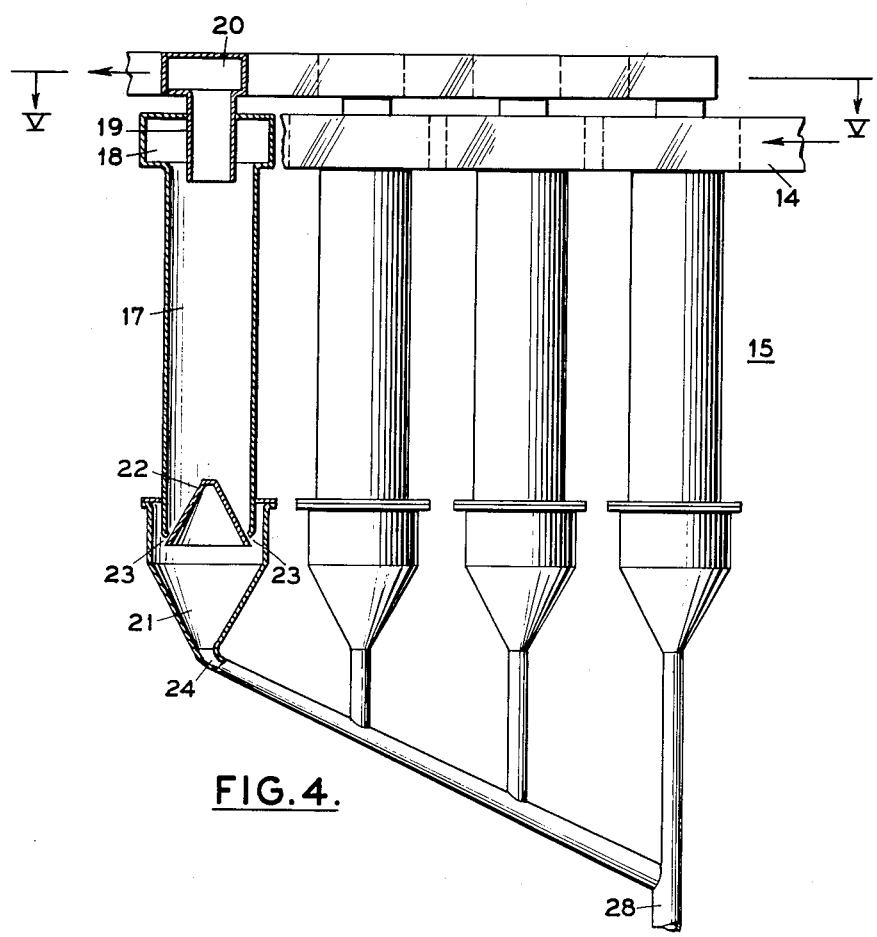
Fig. 4 is a side elevation, partly in section, of the dust collecting system.
Figure 5:
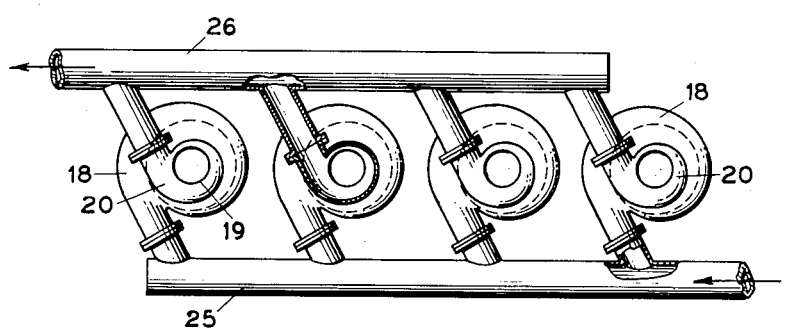
Fig. 5 is a sectional top view of the dust collecting system, the section being taken along the line V—V in Fig. 4.

The dust collecting system 15 comprises a number of cyclone dust separators 16 each of the same design, and therefore only one will be described in detail. As shown in Figs. 4 and 5, each individual separator has a cylindrical housing 17 extending into a cone 21. A truncated cone 22 extends into the cylindrical housing 17 in such a manner as to provide an annular discharge gap 23 in the bottom of the cylindrical housing 17. A dust discharge pipe 24 connects the bottom of the cylindrical cone 21 to the dust conveying line 28. The top of the cylindrical housing 17 carries a vortex head 18 for tangential entrance of the gases from the gas conduit 14 into the separator. A gas outlet conduit 19 passes from above through the vortex head 18 into the interior of the cyclone housing 17 and is provided with a vortex head 20 at the external end. The vortex head 20 discharges gases into the gas conduit 26 which in turn is connected to the suction side of the blower 27 (Fig. 1). The dust removed from the exhausting gas stream in the dust collecting system 15 passes through line 28 to the feed pipe 41 of the kiln 1. A gas seal container 29, of the same design as described for the container 59, is positioned in the dust conveying line 28 to prevent the kiln gases from by-passing through the dust collecting system.

A blower 81 is provided for supplying air to the plenum chambers of the various gas sealing containers (Fig. 1). An air conduit 18 extends from blower 81 to the plenum chamber of the gas seal container 47 and enters this plenum chamber through an air conduit 49. An air conduit 61 extends from the air conduit 18 to the plenum chamber of the gas seal container 59. An air conduit 70 connects the air conduit 18 to the plenum chamber of the gas seal container 69, and an air conduit 74 connects conduit 18 to the plenum chamber of the gas seal container 73. An air conduit 32 extends from the blower 81 to the plenum chamber of gas seal container 29 of the dust conveying line 28. An air conduit 108 extends from conduit 32 to the plenum chamber of the gas seal container 77.

In the operation of the apparatus, the hot gases discharge from the kiln 1 into the gas conduit 3 and flow upwardly through the separators 4, 9, 10, 11 and through the dust separating system 15 to the suction side of the blower 27, and then to atmosphere.

The raw material from bin 42 is conveyed to the material pipe 45 by the elevator 44. From pipe 45 the material enters the gas seal container 47. Air supplied by the blower 81 through conduits 18, 49 to the plenum chamber of the container 47 fluidizes the material in the chamber from which the material is discharged through pipe 56 into the gas conduit 13. The material discharging from the material pipe 56 into the gas stream of the conduit 13 is entrained in the gas stream and conveyed to the separator 11. The material in the gas stream of conduit 13 and in the separator 11 will receive heat contained in the gas stream thereby increasing the temperature of the material. The material and gas are separated in the separator 11 with the gas exhausting through the gas conduit 14 and the material discharging through the material outlet of the separator. The material drains by gravity from separator 11 into compartment 63 of gas seal container 59. A small amount of air admitted into the plenum chamber 59b through the air conduit 61 passes through the porous medium 60 into the material contained in the material chamber 59a. The air passing into the material has the effect of fluidizing the material so that the material in compartment 63 acquires the properties of a hydrostatic head and tends to seek a hydrostatic level between the compartments 63 and 64. As long as the material in the compartment 63 is above the upper edge of the weir plate 65 the hydrostatic head of material will force the material over the top of the weir plate 65 into the discharge compartment 66. In the event that the material flowing from the separator 11 is interrupted, the head of material in the compartment 63 will seek the same level as the height of the weir plate 65, thereby providing a material seal between the interior of the separator 11 and the interior of the gas conduit 12. The material in the discharge compartment 66 of the gas seal container 59 discharges through pipe 67 into the gas conduit 12. The aerated material discharging from pipe 67 is further diffused by the distribution plate 68 prior to being entrained in the gas stream of the conduit 12.

The entrained material in the gas stream of the conduit 12 is conveyed to the separator 10 wherein the material and gas are separated. The separated gas is discharged from the separator 10 through the conduit 13. The separated material is discharged through the material outlet of the separator 10 through the gas seal container 69, in the same manner as described for the container 59, into the material pipe 71. Pipe 71 conveys the aerated material into the gas conduit 8 where the material is entrained in the gas stream from separator 5 and conveyed to the separator 9. In separator 9, the gas and the material are again separated. The gas discharges through the conduit 12, and the material discharges into the gas seal container 73. From container 73 the aerated material is conveyed by the material discharge pipe 75 into the gas stream of the gas conduit 3 leading to the separator 4. The gas separated in the separator 4 passes into the conduit 8, and the separated material drains into the gas seal container 77. From container 77 the material passes through pipe 109 into the kiln 1 for further treatment.

As the material passes through the series of separators and gas conduits, it increases its temperature as it progresses closer to the feed end of kiln 1 because of the hotter gases in the lower separators. The surfaces of the particles of material tend to become adhesive during the latter stages of preheating. This may cause the material to agglomerate or to adhere to the surfaces of the apparatus. The air admitted into the plenum chambers of the respective gas sealing containers is of relatively low pressure and of small volume. The small amount of air passing through the material contained in the gas seal container is not sufficient to appreciably reduce the temperature of the material but suffices to slightly reduce the surface temperature of the particles of material to eliminate adhesion.

A modified form of the gas seal container is shown in Figs. 6 and 7. As to structural design and operation, the container 82 is similar to container 59. However, in container 82 the gas permeable member 83 is disposed at an angle to the horizontal, and an opening 84 is provided in the lower portion of the container 82 above the porous medium 83. The opening 84 is controlled by a sliding gate 91 movable between two guide rails 92.

Any oversize material reaching the container 82 will drop to the bottom of the material confining chamber and slide along member 83 down to its lower end. The oversize material can be removed from the container 83 by lifting the gate 91 and permitting the material to discharge through the opening 84. If desired, the opening 84 may be positioned at the lower end of the weir plate 86 above the gas permeable member 83. In the latter case, the slide gate, controlled externally of the container 82, is to cover the opening 84 in the plate 86 so that, when the gate is opened, any accumulated coarse material will drop through the discharge chamber 89 into material discharge pipe connected thereto. With this latter arrangement, the oversize material may be discharged back into the system wherein it will ultimately find its way to the kiln 1 through the various gas seal containers without being entrained in the gas stream.

The modified form of the dust collecting system shown in Fig. 8 comprises a group of cyclone type separators which discharge separated material into a container 95 through respective material discharge pipes 94. The container 95 is divided into a material confining compartment 100 and a plenum chamber 98 by a gas porous medium 96 positioned between the top and bottom of the container 95. A weir plate 101 is positioned at one end of the material confining compartment 100 and forms one side wall of a material discharge chamber 102 within the container 95. An air conduit 97 supplies air to the plenum chamber 98 of the container 95.

In the operation of the modified form of the dust collecting system material is discharged from the separators 93 into the container 95 through the material discharge pipes 94. Air admitted to the plenum chamber 98 through the conduit 97 passes through the gas permeable member 96 into the material contained in the chamber 100. The air is passed through the gas permeable member at sufficiently low pressure and small volume to render the material in the chamber 100 fluent without entraining the material in the air. The material in a fluidized state will acquire the characteristics of a fluid wherein the head of material in the discharge pipes 94 will force the material in the container 100 over the edge of the weir 101. In the event that the flow of material from the separators 93 is interrupted, the fluidized material in the pipes 94 will seek the same level as the height of the material in the chamber 100, thereby providing a column of material in the pipes 94 of a height equal to the distance between the bottom of the discharge pipes 94 and the top of the weir 101. This column of material will provide a seal for any gases attempting to enter the cyclones through the material discharge compartment 102.

The modification according to Fig. 8 has the advantage that it provides not only a gas seal for the dust collector as a whole but also seals the individual cyclones of the collecting system from each other, thus maintaining a certain pressure difference between them. When providing such a self-sealing collector, a separate sealing container (29 in Fig. 1) is not required.

It will be understood from the description of the various types of sealing devices that, irrespective of the pressure differences between the various cyclones and the kiln, the gas stream must follow the prescribed path through the apparatus and is prevented from by-passing through any of the various material discharge pipes. In a commercial installation the negative pressure in cyclone 11 was approximately 550 mm. water column; in cyclone 10: 400 mm. water column, in cyclone 9: 250 mm. water column, and in cyclone 4: 100 mm. water column.

It will be apparent to those skilled in the art, upon a study of this disclosure, that the invention permits of various embodiments and modifications other than those specifically shown and described without departing from the essential features of the invention and within the scope of the claims annexed hereto.

I claim:

1. Apparatus for heating fine granular material by hot kiln exit gases, comprising a series of cyclone-type separators disposed at different respective heights, each separator having a tangential gas inlet and an upwardly directed gas outlet conduit and a downwardly directed material discharge pipe, each lower separator having its gas outlet conduit joined with the gas inlet of an upper separator to form a continuous ascending gas path, a source of material, a material supply pipe extending from the source of material into the conduit joined with the gas inlet of the uppermost separator, each upper separator having its material discharge pipe terminating within the gas outlet conduit of a lower separator to form a descending path for the material, a trap seal structure interposed between each separator and its material discharge pipe and having a trap chamber for material and an edge to be overflown by material from said chamber, said seal structures being mounted outside said gas conduits and adjacent to said respective separators, and supply means for gas of lower temperature than the hot waste gases entering said separators, said gas supply means being connected with said respective chambers for passing gas through the material in said chamber.

2. Apparatus for heating fine granular material by hot kiln exit gases, comprising a series of cyclone-type separators disposed at different respective heights, each separator having a lateral gas inlet and an upwardly directed gas outlet conduit and a material outlet, each lower separator having its gas outlet conduit joined with the gas inlet of an upper separator to form a continuous ascending gas path, a container disposed beneath each separator and in communication with the material outlet thereof, a gas-permeable wall positioned between the top and bottom of the container and dividing said container into a material confining chamber and a gas plenum chamber, a material discharge pipe for each separator, said material discharge pipe communicating with the material confining chamber of the container and extending downwardly therefrom, a source of material, a material supply pipe extending from the source of material into the conduit joined with the gas inlet of the uppermost separator, each upper separator having its material discharge pipe terminating within the gas outlet conduit of a lower separator to form a descending path for the material, and gas supply means connected with said plenum chamber for forcing a gas from said plenum chamber through said permeable wall into the material confining chamber of each container.

3. Apparatus for heating pulverulent material such as cement raw material, comprising a kiln, a series of separators disposed at different respective heights above said kiln, each separator having a lateral gas inlet and an upwardly directed gas outlet conduit and a material outlet, a gas conduit connecting said kiln with the gas inlet of the lowermost separator, each lower separator having its gas outlet conduit joined with the gas inlet of the next upper separator to form a continuous ascending gas path, a container disposed beneath each separator and in communication with the material outlet thereof, a gas-permeable wall positioned between the top and bottom of the container and dividing said container into a material confining chamber and a gas plenum chamber, a material discharge pipe for each separator, said material discharge pipe communicating with the material confining chamber of the container and extending downwardly therefrom, a material supply pipe extending into the conduit joined with the gas inlet of the uppermost separator, each separator—except the lowermost separator—having its material discharge pipe terminating within the conduit leading to the gas inlet of the next lower separator, the lowermost separator having its material discharge pipe terminating within said kiln, and pressure gas supply means connected with all of said plenum chambers for forcing gas from each plenum chamber through the gas-permeable wall into the material confining chamber of each container.

4. Apparatus for preheating cement raw material by hot kiln exit gases, comprising a kiln having a gas outlet conduit and a material inlet, a series of separators disposed at different respective heights above said kiln, each separator having a lateral gas inlet and an upwardly directed gas outlet conduit and a material outlet, said gas outlet conduit of said kiln being joined with the gas inlet of the lowermost separator, each other separator—except the uppermost separator—having its gas outlet conduit joined with the gas inlet of the next upper separator, a dust collector having a gas inlet and a gas outlet and a dust material outlet, the gas outlet of the uppermost conduit being joined with the gas inlet of said dust collector, an exhaust blower joined with the gas outlet of the dust collector, a container disposed beneath each separator and having an inlet opening and an outlet opening, said container inlet opening being joined with the separator material outlet, a material discharge pipe for each separator, the material discharge pipe of each separator joined with the outlet opening of the container and extending downwardly therefrom, each separator—except the lowermost separator—having its material discharge pipe terminating within the gas outlet conduit of a lower separator, the lowermost separator having its material discharge pipe joined with said material inlet of said kiln, material supply means having a material supply pipe extending into the conduit joined with the gas inlet of the uppermost separator, a second container having an inlet and outlet opening disposed in the material supply pipe, a dust return pipe extending from the dust collector material outlet to the kiln material inlet, a third container disposed in the dust return pipe, each of said containers having a gas-permeable wall positioned between the top and bottom of the container and dividing the container into a material confining chamber and a gas plenum chamber, and gas supply means connected with said plenum chambers for forcing a gas from each plenum chamber through the gas-permeable wall into the material confining chamber of each container.

5. In apparatus according to claim 2, one of said containers having said gas-permeable wall sloping from the side of the material outlet of the next upper separator downwardly toward the material discharge pipe of said latter separator to make any coarse inclusions in the material slide downward along said wall, and said one container having an opening through which said material confining chamber is accessible from the outside, said opening being adjacent to the lower side of said wall and located in a plane parallel to the sloping direction of said wall, and closure means normally covering said opening and controllable from the outside of said container for discharging accumulated inclusions.

6. Apparatus for heating fine granular material, by hot waste gases, comprising such as cement raw material, a gas-from-dust separator having a lateral gas inlet, a gas outlet on the top of the separator, and a material discharge opening at the bottom of the separator, a source of hot gases connected to said gas inlet, a container disposed beneath the separator and joined therewith, said container communicating with said material discharge opening and having a gas-permeable wall positioned between the top and bottom of the container and dividing the container into an upper material-confining chamber and a lower gas-plenum chamber, a material discharge pipe, said material discharge pipe communicating with the material confining chamber of the container and extending downward therefrom, and gas supply means connected with said plenum chamber for forcing a gas from the plenum chamber through the gas-permeable wall into said material confining chamber.

7. In combination, a cyclone-type separator having a lateral gas inlet, a gas outlet on the top of the separator and a material discharge pipe extending downward from the bottom of the separator, a source of hot gases connected to said gas inlet, a container having a discharge opening, a gas-permeable wall positioned beneath the top and bottom of the container and dividing the container into a material confining chamber and a gas plenum chamber, said discharge pipe of said separator extending into said material confining chamber and terminating in upwardly spaced relation to said wall and beneath said discharge opening of said container, a gas supply means connected with said plenum chamber means for forcing gas from said plenum chamber through said permeable wall into said confining chamber.

8. In combination, a group of cyclone-type separators of respectively different interior gas pressures, gas conduit means tangentially joined with each of said separators, each separator having a gas outlet on top and a dust discharge pipe extending downward from the bottom of the separator, a container extending beneath and along all said separators, a gas-permeable wall disposed in said container and forming together therewith an upper chamber and a lower chamber, said wall having a position inclined toward the horizontal and said container having an overflow opening upwardly spaced from said wall at the lower end thereof, said dust discharge pipes entering from above into said container and terminating above said wall but below said opening and in spaced relation to each other relative to the direction of inclination of said wall, and gas supply means communicating with said lower chamber for forcing gas through said permeable wall into said upper chamber.

References Cited in the file of this patent
UNITED STATES PATENTS

| | | |
|---|---|---|
| 724,780 | Bassler | Apr. 7, 1903 |
| 2,316,814 | Schemm | Apr. 20, 1943 |
| 2,421,664 | Tyson | June 3, 1947 |
| 2,648,532 | Muller et al. | Aug. 11, 1953 |